United States Patent
Niitsuma et al.

(10) Patent No.: US 10,471,861 B2
(45) Date of Patent: Nov. 12, 2019

(54) CONVEYANCE SEAT

(71) Applicant: TS TECH CO., LTD., Asaka-shi, Saitama (JP)

(72) Inventors: Kenichi Niitsuma, Tochigi (JP); Naoki Tamura, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 71 days.

(21) Appl. No.: 15/573,010

(22) PCT Filed: May 10, 2016

(86) PCT No.: PCT/JP2016/063919
§ 371 (c)(1),
(2) Date: Nov. 9, 2017

(87) PCT Pub. No.: WO2016/181973
PCT Pub. Date: Nov. 17, 2016

(65) Prior Publication Data
US 2018/0141475 A1     May 24, 2018

(30) Foreign Application Priority Data
May 11, 2016 (JP) .................. 2015-096625

(51) Int. Cl.
*B60N 2/42* (2006.01)
*B60N 2/80* (2018.01)
(Continued)

(52) U.S. Cl.
CPC ........... *B60N 2/4207* (2013.01); *B60N 2/427* (2013.01); *B60N 2/4228* (2013.01);
(Continued)

(58) Field of Classification Search
CPC ......... A47C 1/023; A47C 1/024; A47C 7/506; A47C 1/035; B60N 2/22
See application file for complete search history.

(56) References Cited

U.S. PATENT DOCUMENTS

| 5,803,491 A | * | 9/1998 | Barnes | ............ B60R 21/01566 |
| | | | | 280/735 |
| 6,805,404 B1 | * | 10/2004 | Breed | ................... B60N 2/002 |
| | | | | 297/216.12 |

(Continued)

FOREIGN PATENT DOCUMENTS

| JP | 2005-186670 A | 7/2005 |
| JP | 2007-296925 A | 11/2007 |

(Continued)

*Primary Examiner* — Shin H Kim
(74) *Attorney, Agent, or Firm* — Drinker Biddle & Reath LLP

(57) ABSTRACT

A vehicle seat whose state is changeable when a rear load is input to a conveyance includes a rotary member configured to move from an initial position in association with the state change, and a lock pin configured to restrict movement of the rotary member. Where a load on the vehicle seat from an occupant based on the rear load changes according to the occupant's physique, weight, etc., when the load is less than a predetermined value and the rotary member moves from the initial position to reach a first position, the lock pin holds the rotary member at the first position. When the load is equal to or greater than the predetermined value, the rotary member, after having reached the first position, moves toward a second position beyond movement restriction by the lock pin, the second position being apart further from the initial position than the first position.

13 Claims, 12 Drawing Sheets

(51) Int. Cl.
  *B60N 2/427*  (2006.01)
  *B60N 2/888*  (2018.01)
  *B60N 2/30*   (2006.01)

(52) U.S. Cl.
  CPC ........... *B60N 2/42781* (2013.01); *B60N 2/80* (2018.02); *B60N 2/888* (2018.02); *B60N 2/3002* (2013.01); *B60N 2002/899* (2018.02)

(56) References Cited

U.S. PATENT DOCUMENTS

| | | | | |
|---|---|---|---|---|
| 7,070,236 | B2 * | 7/2006 | Kawashima | B60N 2/4228 297/216.1 |
| 10,059,234 | B2 * | 8/2018 | Barbat | B60N 2/888 |
| 2005/0052060 | A1 * | 3/2005 | Beloch | B60N 2/0228 297/284.7 |
| 2005/0140190 | A1 * | 6/2005 | Kawashima | B60N 2/4228 297/216.14 |
| 2006/0186713 | A1 * | 8/2006 | Breed | B60N 2/0232 297/216.12 |
| 2014/0217792 | A1 * | 8/2014 | Meyer | H02H 7/122 297/284.8 |
| 2015/0300785 | A1 * | 10/2015 | Lamparter | F41H 7/046 297/216.17 |

FOREIGN PATENT DOCUMENTS

| | | |
|---|---|---|
| JP | 2009-001209 A | 1/2009 |
| JP | 2014-000835 A | 1/2014 |

\* cited by examiner

CONVEYANCE SEAT

CROSS REFERENCE TO RELATED APPLICATIONS

This application is a National Stage Entry application of PCT Application No. PCT/JP2016/063919, filed May 10, 2016, which claims the priority benefit of Japanese Patent Application No. JP 2015-096625, filed May 11, 2015, the contents being incorporated herein by reference.

BACKGROUND

The present disclosure relates to a conveyance seat, and particularly relates to a conveyance seat whose state is changeable when a rear load is input to a conveyance.

A seat configured such that a state at a predetermined portion of the seat is changeable when a rear load is input to a conveyance has been already known as a conveyance seat including a vehicle seat. According to the conveyance seat employing such a configuration, the state at the predetermined portion is changed so that impact energy (rear collision impact energy) generated by input of the rear load can be absorbed.

Specific examples of the above-described configuration include a vehicle seat described in Japanese Patent Publication JP 2009-001209 A. The vehicle seat described in Japanese Patent Publication JP 2009-001209 A is now described. In this seat, an impact absorption unit is provided between a seat back and a seat cushion. This unit includes a one-side member configured to rotate in synchronization with either one of a seat-back-side member or a seat-cushion-side member configured to rotate relative to each other for tilting of the seat back, and an other-side member configured to rotate in synchronization with the other one of the seat-back-side member or the seat-cushion-side member. Moreover, the one-side member has a raised portion, and the other-side member has a recessed portion or a through-hole into which the raised portion is fitted.

When a rear load is applied to a vehicle, the raised portion and the recessed portion (the through-hole) deform by relative rotation with the raised portion being fitted into the recessed portion. With this configuration, the impact absorption unit absorbs the back collision impact energy in the vehicle seat described in Japanese Patent Publication JP 2009-001209 A. Moreover, the impact energy is absorbed, and therefore, a burden on the neck of a person (i.e., an occupant of the conveyance) seated on the seat is reduced.

SUMMARY

The effect of reducing the load on the occupant by the change in the state at the predetermined portion of the seat varies depending on the physique, etc. of the occupant seated on the seat. For this reason, in the case of changing the state at the predetermined portion of the seat for the purpose of reducing the load, such a state change amount (in other words, a changed state) is preferably set by considering the occupant's physique, etc.

For this reason, the present disclosure has been made in view of the above-described problem, and is intended to provide, in an embodiment, a conveyance seat whose state is changeable when a rear load is input to a conveyance, a conveyance seat capable of properly changing its state according to an occupant's physique, etc.

The above-described problem is solved by an embodiment of the conveyance seat of the present disclosure. The conveyance seat of the present disclosure is a conveyance seat whose state is changeable when a rear load is input to a conveyance. The conveyance seat includes a movable portion configured to move from an initial position in association with the state change, and a movement restriction portion configured to restrict movement of the movable portion. In a case where an occupant load on the conveyance seat from an occupant of the conveyance in association with input of the rear load changes according to a feature value regarding the body of the occupant, when the occupant load is less than a predetermined value and the movable portion moves from the initial position to reach a first position, the movement restriction portion holds the movable portion at the first position. When the occupant load is equal to or greater than the predetermined value, the movable portion further moves, after having reached the first position, toward a second position beyond movement restriction by the movement restriction portion, the second position being apart further from the initial position than the first position.

According to the conveyance seat of the present disclosure configured as described above, when a state at a predetermined portion of the seat changes upon input of the rear load to the conveyance, the movable portion moves in association with such a state change while the movement restriction portion restricts movement of the movable portion. In the case where the occupant load on the conveyance seat from the occupant of the conveyance in association with input of the rear load changes according to the occupant's physique, etc., when the occupant load is less than the predetermined value and the movable portion moves from the initial position to reach the first position, the movement restriction portion holds the movable portion at the first position. On the other hand, when the occupant load is equal to or greater than the predetermined value, the movable portion further moves, after having reached the first position, from the first position toward the second position beyond movement restriction by the movement restriction portion. As described above, in the conveyance seat of the present disclosure, the arrival position of a movable body upon input of the rear load, i.e., the state at the predetermined portion of the seat changed upon input of the rear load, changes according to the occupant's physique, etc. That is, according to the conveyance seat of the present disclosure, when the state changes upon input of the rear load, a proper changed state is brought according to the occupant's physique, etc.

Moreover, the above-described conveyance seat preferably further includes a head rest configured to support the head of the occupant, in an embodiment. The head rest preferably tilts forward when the rear load is input to the conveyance. The state is preferably a degree of forward tilting of the head rest. The movable portion preferably moves in association with a change in the degree of forward tilting. The degree of forward tilting when the movable portion is at the second position is preferably greater than that when the movable portion is at the first position. In the above-described configuration, the degree of forward tilting when the degree of forward tilting of the head rest is changed upon input of the rear load is properly set according to the occupant's physique, etc. As a result, when a burden on the neck of the occupant is reduced by forward tilting of the head rest upon input of the rear load, such a burden reduction effect can be properly exerted according to the occupant's physique, etc.

Further, the above-described conveyance seat more preferably further includes a pressure receiving member provided in a seat back and pushed by the back of the occupant, in an embodiment. When the rear load is input to the conveyance, the pressure receiving member is more preferably pushed by the back of the occupant to move backward together with the back of the occupant. The state is more preferably a position of the pressure receiving member in a front-to-back direction. The movable portion more preferably moves in association with a change in the position of the pressure receiving member. The position of the pressure receiving member when the movable portion is at the second position is more preferably on a back side with respect to that when the movable portion is at the first position. In the above-described configuration, an arrival position (a position after movement) when the pressure receiving member moves backward upon input of the rear load is properly set according to the occupant's physique, etc. As a result, when the burden on the neck of the occupant is reduced by backward movement of the pressure receiving member upon input of the rear load, such a burden reduction effect can be properly exerted according to the occupant's physique, etc.

In addition, in the above-described conveyance seat, the movement restriction portion is much more preferably a contact portion configured to contact the movable portion when the movable portion reaches the first position, thereby restricting movement of the movable portion, in an embodiment. The contact portion much more preferably deforms when pressed with a pressing force equal to or greater than a threshold. When the occupant load is equal to or greater than the predetermined value, the movable portion much more preferably deforms, in contact with the contact portion at the first position, the contact portion by pressing the contact portion with the pressing force equal to or greater than the threshold, and deformation of the contact portion allows the movable portion to move toward the second position beyond a contact state with the contact portion. In the above-described configuration, when the occupant load on the conveyance seat from the occupant upon input of the rear load is equal to or greater than the predetermined value, the movable portion presses the contact portion with the pressing force equal to or greater than the threshold, thereby deforming the contact portion. Such deformation of the contact portion allows the movable portion at the first position to further move toward the second position. With such a configuration, the strength of the contact portion is properly set so that the seat state changeable upon input of the rear load can be changed according to the occupant's physique, etc.

Moreover, in the above-described conveyance seat, the contact portion is much more preferably a pin provided with a weak portion, and the pin much more preferably deforms starting from the weak portion when pressed with the pressing force equal to or greater than the threshold, in an embodiment. In the above-described configuration, the weak portion is formed at the pin as the contact portion. This weak portion functions as a deformation start point when the pin is pressed by the movable portion with the pressing force equal to or greater than the threshold. With this weak portion formed at the pin, when the occupant load on the conveyance seat from the occupant upon input of the rear load is equal to or greater than the predetermined value, the pin can be reliably deformed. As a result, when the occupant load is equal to or greater than the predetermined value, the movable portion at the first position can be reliably moved toward the second position.

Further, in the above-described conveyance seat, the movable portion may have a contact target portion contacting the movement restriction portion when the movable portion reaches the first position, in an embodiment. The contact target portion may deform when pressed with the pressing force equal to or greater than the threshold. When the occupant load is equal to or greater than the predetermined value and the movable portion is at the first position, the contact target portion may deform by pressing from the movement restriction portion with the pressing force equal to or greater than the threshold, and deformation of the contact target portion may allow the movable portion to move toward the second position beyond movement restriction by the movement restriction portion. In the above-described configuration, when the occupant load on the conveyance seat from the occupant upon input of the rear load is equal to or greater than the predetermined value, a portion (specifically, the contact target portion) of the movable portion deforms. Such deformation of the portion allows the movable portion at the first position to further move toward the second position. With such a configuration, the strength of the contact target portion is properly set so that the seat state changeable upon input of the rear load can be changed according to the occupant's physique, etc.

In addition, in the above-described conveyance seat, the movement restriction portion may be a biasing portion configured to provide the movable portion with biasing force in the direction of blocking movement of the movable portion, in an embodiment. The biasing portion may provide different magnitudes of the biasing force between i) before arrival of the movable portion at the first position, and ii) after arrival of the movable portion at the first position. When the occupant load is less than the predetermined value, the movable portion having reached the first position may be held at the first position by the magnitude of the biasing force after the arrival of the movable portion at the first position. When the occupant load is equal to or greater than the predetermined value, the movable portion may move toward the second position against the magnitude of the biasing force after the arrival of the movable portion at the first position. In the above-described configuration, when the occupant load on the conveyance seat from the occupant upon input of the rear load is less than the predetermined value, movement of the movable portion is blocked by the biasing force from the biasing portion. When the above-described occupant load is equal to or greater than the predetermined value, the movable portion moves toward the second position against the biasing force. With such a configuration, the magnitude (in a precise sense, the magnitude when the movable portion reaches the first position) of biasing force provided by the biasing force is properly set so that the seat state changeable upon input of the rear load can be changed according to the occupant's physique, etc.

Moreover, in the above-described conveyance seat, the movement restriction portion may be a raised portion of the seat back protruding toward the movable portion, in an embodiment. The raised portion may be inserted into a through-hole formed at the movable portion, and may move back and forth in the through-hole in association with movement of the movable portion and contact a lock portion provided in the through-hole when the movable portion reaches the first position. When the occupant load is equal to or greater than the predetermined value, the raised portion may move over the lock portion in the through-hole, and the movable portion may move toward the second position beyond a contact state between the raised portion and the lock portion. In the above-described configuration, when the occupant load on the conveyance seat from the occupant upon input of the rear load is equal to or greater than the predetermined value, the raised portion moves over the lock portion in the through-hole, and the movable portion moves toward the second position beyond the contact state between the raised portion and the lock portion. With such a configuration, the shapes, etc. of the raised portion and the lock portion are properly set so that the seat state changeable upon input of the rear load can be changed according to the occupant's physique, etc.

According to an embodiment of the present disclosure, when the state changes upon input of the rear load to the conveyance, a suitable changed state is brought according to the occupant's physique, etc. Moreover, according to an embodiment of the present disclosure, the burden on the occupant's neck can be reduced by forward tilting of the head rest upon input of the rear load, and such a burden reduction effect can be properly exerted according to the occupant's physique, etc. Further, according to an embodiment of the present disclosure, the burden on the occupant's neck can be reduced by backward movement of the pressure receiving member upon input of the rear load, and such a burden reduction effect can be properly exerted according to the occupant's physique, etc. In addition, according to an embodiment of the present disclosure, the strength of the contact portion as the movement restriction portion is properly set so that the seat state changeable upon input of the rear load can be changed according to the occupant's physique, etc. Moreover, according to an embodiment of the present disclosure, when the occupant load on the conveyance seat from the occupant upon input of the rear load is equal to or greater than the predetermined value, the pin forming the contact portion can be reliably deformed, and the movable portion at the first position can be reliably moved toward the second position. Further, according to an embodiment of the present disclosure, the strength of the contact target portion provided at the movable portion is properly set so that the seat state changeable upon input of the rear load can be changed according to the occupant's physique, etc. In addition, according to an embodiment of the present disclosure, the magnitude (in a precise sense, the magnitude when the movable portion reaches the first position) of biasing force provided to the movable portion is properly set so that the seat state changeable upon input of the rear load can be changed according to the occupant's physique, etc. Moreover, according to an embodiment of the present disclosure, the shapes etc. of the raised portion and the lock portion are properly set so that the seat state changeable upon input of the rear load can be changed according to the occupant's physique, etc.

BRIEF DESCRIPTION OF DRAWINGS

Various embodiments of the invention are illustrated in the drawings in which.

DETAILED DESCRIPTION

Various embodiments of the present disclosure are described below. Note that a vehicle seat mounted on a vehicle (an automobile) is described below as an example of a conveyance seat. Note that the conveyance seat of the present disclosure can be mounted on other conveyances than the above-described vehicle, such as airplanes and ships. Moreover, the embodiments described below are set forth merely as an example for the sake of easy understanding of the present disclosure, and is not intended to limit the present disclosure. That is, changes and modifications can be made to the embodiments of the present disclosure without departing from the gist of the present disclosure, and needless to say, equivalents are included in the present disclosure.

Further, in the description below, a "front-to-back direction" means a front-to-back direction of the vehicle seat, and is specifically a direction coincident with a vehicle travelling direction. In addition, a "width direction" means a width direction (a right-to-left direction) of the vehicle seat, and is a direction coincident with a width direction of a seat back included in the vehicle seat. Moreover, unless otherwise provided, values in a normal state (in a normally-seatable state) are described regarding the positions, states, etc. of each unit and each component forming the vehicle seat.

Basic Configuration of Vehicle Seat of the Present Embodiment

Figure 1:
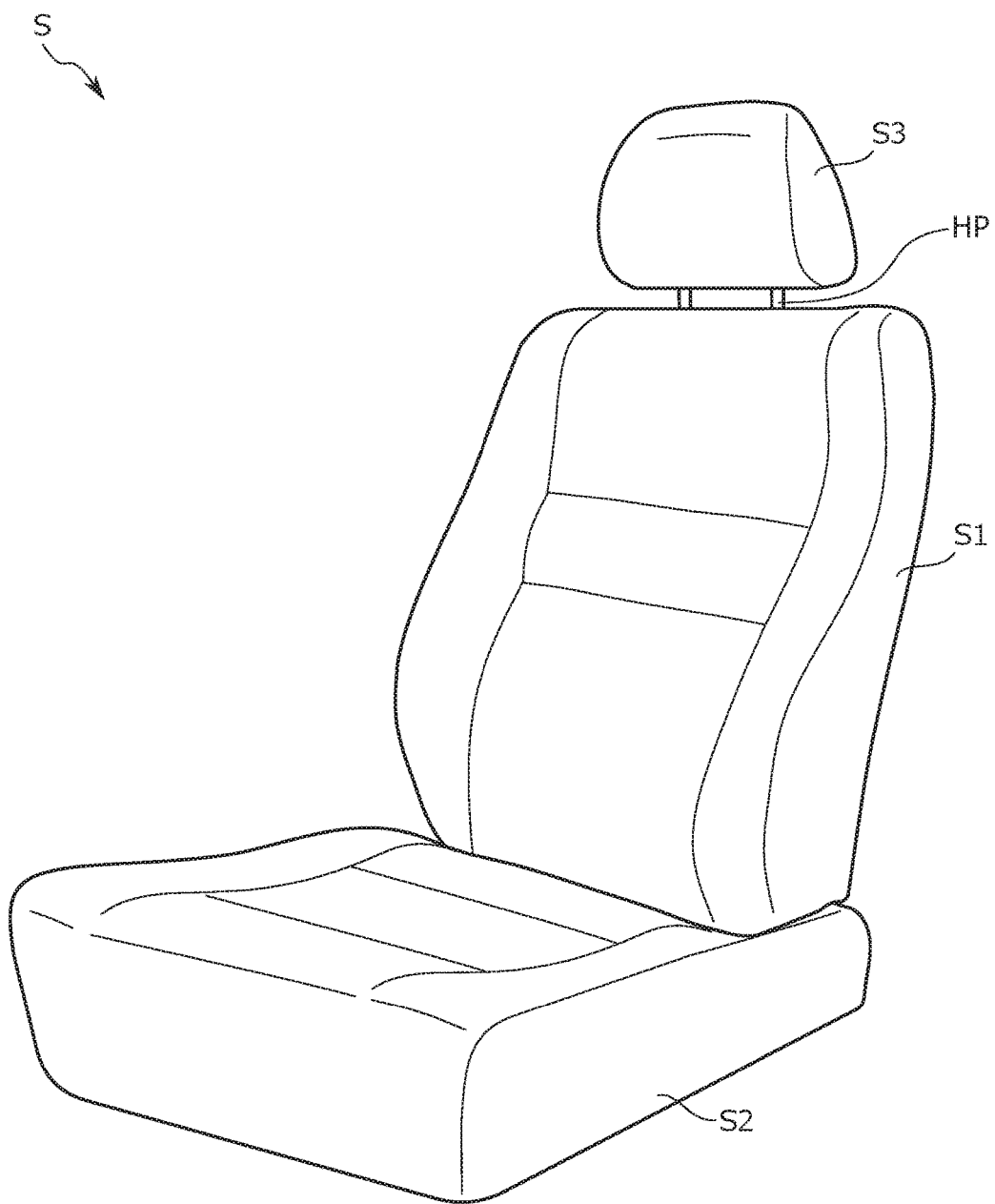
FIG. 1 is a perspective view of a conveyance seat of one embodiment of the present disclosure.
Figure 2:
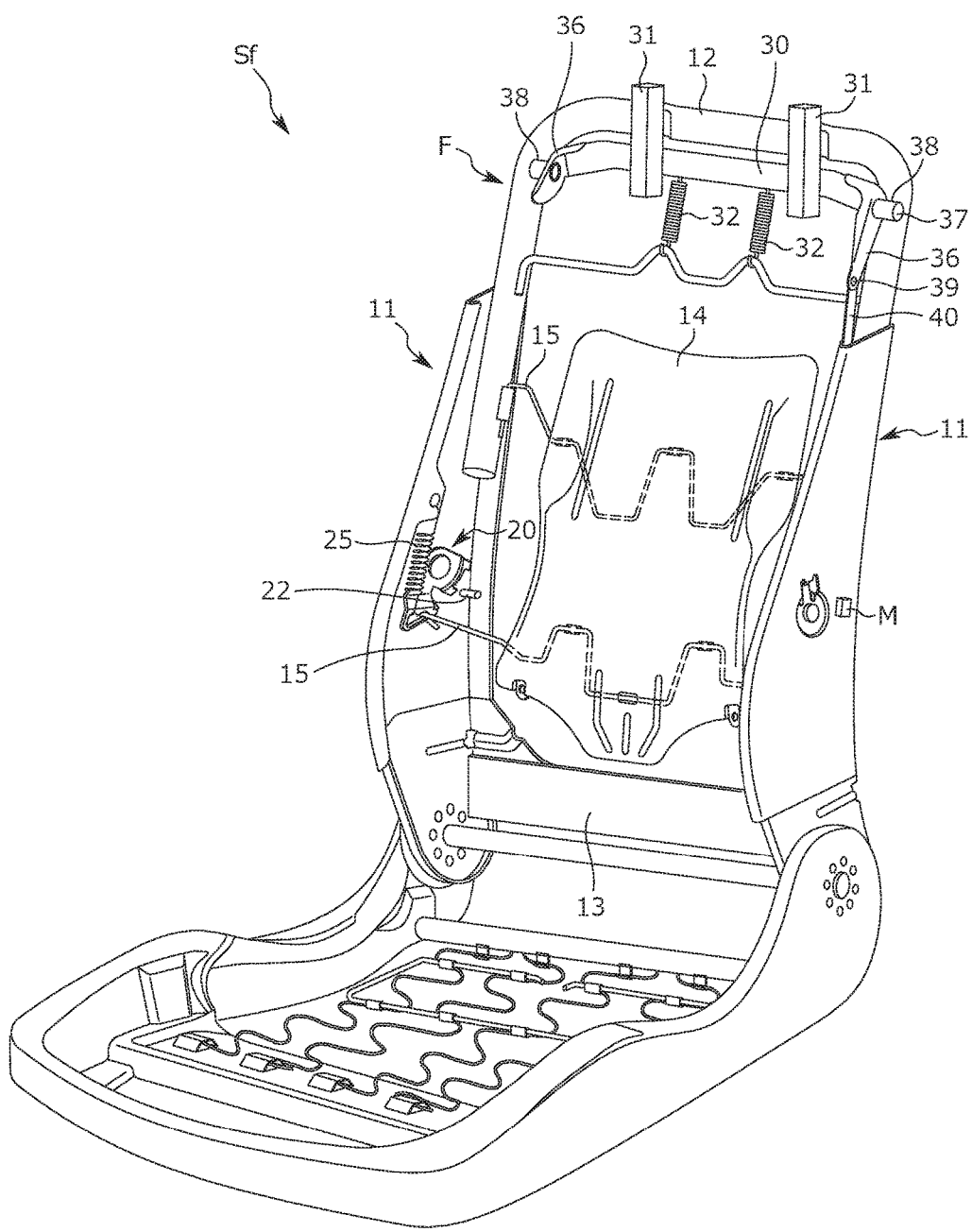
FIG. 2 is a perspective, schematic view of a seat frame of one embodiment of the present disclosure.

First, a basic configuration of the vehicle seat (hereinafter referred to as a "present seat S") of the present embodiment is described with reference to FIGS. 1 and 2. FIG. 1 is a perspective view of an outer appearance of the present seat S for describing the basic configuration of the present seat S. FIG. 2 is a perspective view of a seat frame Sf forming a framework of the present seat S.

As illustrated in FIG. 1, the present seat S includes a seat back S1 configured to support an occupant's back, a seat cushion S2 configured to support the occupant's buttocks, and a head rest S3 configured to support the occupant's head. Moreover, the present seat S includes the seat frame Sf as the framework therein. Of this seat frame Sf, a seat back frame F as a framework of the seat back S1 forms, as illustrated in FIG. 2, a generally rectangular frame as viewed from the front. More specifically, the seat back frame F has a pair of side frames 11 provided in the width direction, an upper frame 12 coupling upper end portions of the side frames 11, and a lower member frame 13 coupling lower end portions of the side frames 11.

Note that as illustrated in FIG. 2, the seat back frame F includes, at an upper end portion thereof, a below-described pillar guide attachment frame 30. Rectangular or cylindrical pillar guides 31 are, by welding, attached to a front surface of this pillar guide attachment frame 30. Head rest pillars HP of the head rest S3 are inserted respectively into the pillar guides 31, and therefore, the head rest S3 is supported on the seat back S1 through the head rest pillars HP and the pillar guides 31.

Moreover, the seat back S1 of the present embodiment includes one or more mechanisms (hereinafter referred to as "neck burden reduction mechanisms") to reduce a burden on the occupant's neck upon input of a rear load to the vehicle, such as rear collision of the vehicle. The neck burden reduction mechanisms are specifically described below. A pressure receiving plate 14 provided in the seat back frame F functions as the neck burden reduction mechanism, in an embodiment. This pressure receiving plate 14 is equivalent to a pressure receiving member, and is formed of a substantially rectangular resin plate disposed between the side frames 11 in the width direction. Moreover, a cushion pad (not shown) is disposed on a front surface of the pressure receiving plate 14.

In the normal state, the above-described pressure receiving plate 14 supports, from the back, the back of the occupant seated on the present seat S. On the other hand, when the rear load is input to the vehicle, the pressure receiving plate 14 is pushed backward by the occupant's back to move backward together with the occupant's back. By such backward movement of the pressure receiving plate 14, the occupant's back sinks in the seat back S1 in association with backward movement of the pressure receiving plate 14 upon vehicle rear collision. As a result, the burden on the occupant's neck is reduced.

A configuration for realizing backward movement of the pressure receiving plate 14 is described with reference to FIG. 2. As illustrated in this figure, the pressure receiving plate 14 is supported by two wires 15 bridged between the side frames 11 in a pair. More specifically, the pressure receiving plate 14 is supported by the two wires 15 in such a manner that a hooking portion (not shown) provided on a back surface of the pressure receiving plate 14 is hooked on each wire 15.

Of the above-described two wires 15, the wire 15 positioned on the lower side is hooked on a rotary member 20 attached to each side frame 11. This rotary member 20 is referred to as a movable portion, and is formed of a substantially fan-shaped metal piece. Moreover, the rotary member 20 is rotatably attached to an inner surface of each side frame 11 through a rotary shaft 20a.

Further, one end portion of a torsion spring 25 is hooked on a front end portion of the rotary member 20. This torsion spring 25 is a member configured to hold the rotary member 20 at a predetermined position. That is, the rotary member 20 is, in the normal state, held at an initial position by application of a biasing force from the torsion spring 25.

On the other hand, the load when the pressure receiving plate 14 is pushed backward by the occupant's back is, upon a vehicle rear collision, transmitted to the rotary members 20 through the wire 15. Thus, each rotary member 20 rotates backward about the rotary shaft 20a against the biasing force of the torsion spring 25. As described above, the rotary member 20 rotates backward to move the lower wire 15 backward, and accordingly, the pressure receiving plate 14 also moves backward (more specifically, a lower end portion of the pressure receiving plate 14 swings backward). As described above, the pressure receiving plate 14 moves, upon vehicle rear collision, backward in association with backward rotation of the rotary members 20. In other words, upon vehicle rear collision, backward rotation of the rotary members 20 from the initial position is accompanied by backward movement (e.g., a position change) of the pressure receiving plate 14.

Figure 3:
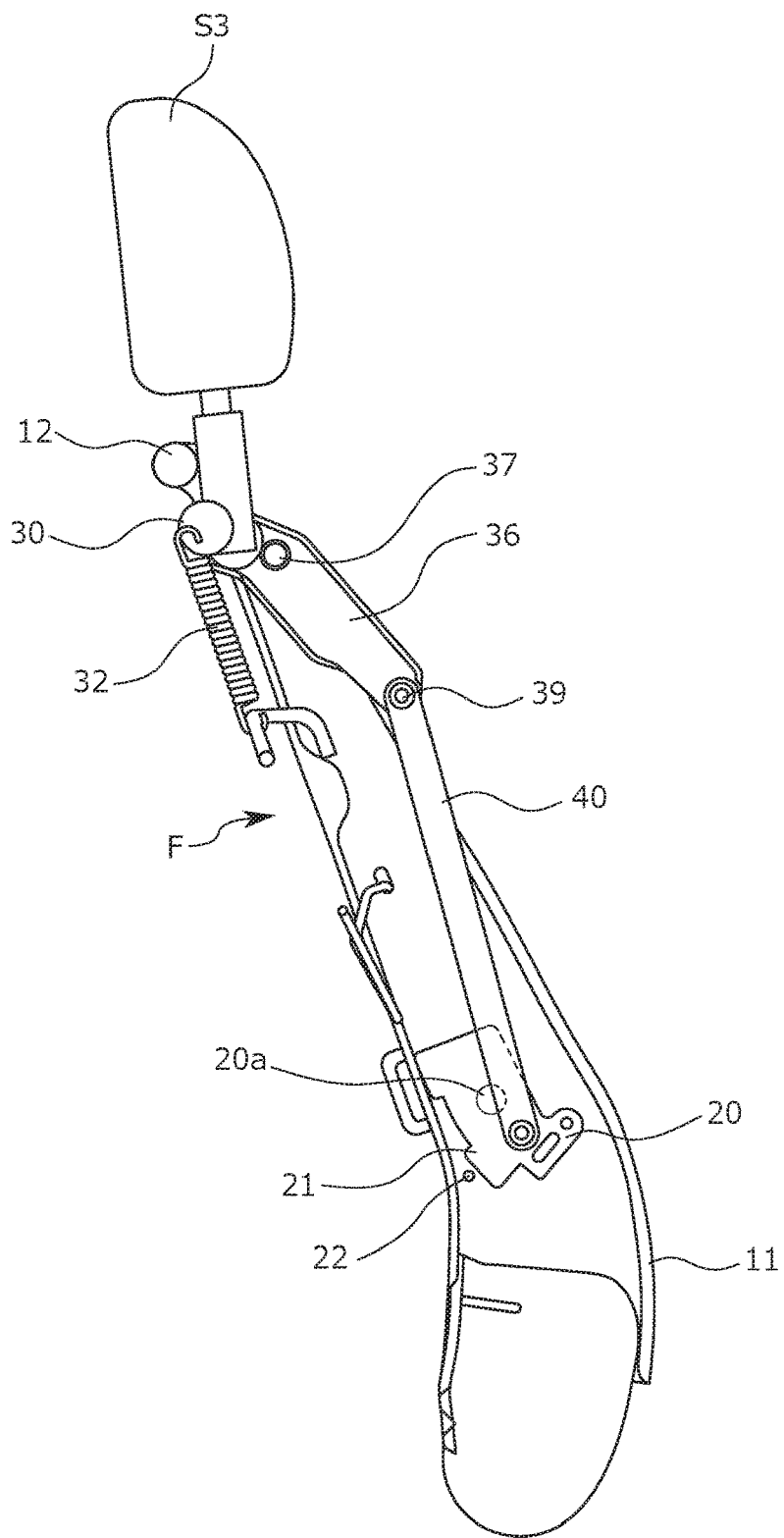
FIG. 3 is a side, schematic view of a drive mechanism of a head rest, according to an embodiment.

Moreover, in the present embodiment, a mechanism configured to tilt the head rest S3 forward upon vehicle rear collision is provided as a second neck burden reduction mechanism. A drive mechanism of the head rest S3 is described below with reference to FIGS. 2 and 3. FIG. 3 is a side view of the drive mechanism of the head rest S3, a cross section of the seat back frame F in the width direction being viewed from one end side (a side opposite to a side on which a later-described coupling link 40 is attached) in the width direction. Note that some components (e.g., the torsion spring 25) around the rotary member 20 are not shown in FIG. 3 for the sake of clarity.

As described above, the head rest S3 is supported on the seat back frame F in such a manner that the head rest pillars HP are inserted respectively into the pillar guides 31. Moreover, the pillar guides 31 are welded to the front surface of the pillar guide attachment frame 30. As illustrated in FIG. 2, this pillar guide attachment frame 30 extends along the width direction, and is disposed at a position next to the upper frame 12 in the upper-to-lower direction.

Further, link brackets 36 having a substantially L-shaped cross section are, by welding etc., fixed respectively to both ends of the pillar guide attachment frame 30. Each link bracket 36 is, through a corresponding one of shafts 37, coupled to a corresponding one of rotation support members 38 welded to the upper frame 12 (more specifically, the vicinity of a portion coupled to the side frame 11). That is, the pillar guide attachment frame 30 is attached to the seat back frame F with the pillar guide attachment frame 30 being rotatable about the shafts 37. When the pillar guide attachment frame 30 rotates, the head rest S3 accordingly rotates about the shafts 37, and moves in the front-to-back direction.

Note that as illustrated in FIG. 2, one end portion of each coil spring 32 is hooked on the pillar guide attachment frame 30. This coil spring 32 is a member configured to hold the pillar guide attachment frame 30 at a predetermined position. That is, the pillar guide attachment frame 30 is, in the normal state, held at an initial position by application of biasing force from the coil springs 32.

Of the link bracket 36 disposed on one end side (the left side as viewed in FIG. 2) in the width direction, an end (specifically, a lower end) on a side opposite to a side connected to the pillar guide attachment frame 30 is a free end. Of the link bracket 36 disposed on the other end side (the right side as viewed in FIG. 2) in the width direction, an end portion (specifically, a lower end portion) on the side opposite to the side connected to the pillar guide attachment frame 30 is, on the other hand, connected to the coupling link 40 through a shaft 39 as illustrated in FIG. 3. This coupling link 40 is interposed between the lower end portion of the link bracket 36 on the other end side in the width direction and a predetermined portion of the above-described rotary member 20.

The coupling link 40 couples the link bracket 36 on the other end side in the width direction and the rotary member 20, and therefore, rotation operation of the rotary member 20 is transmitted to the link bracket 36 through the coupling link 40. With this configuration, the link bracket 36 rotates about the shaft 37.

As a result of rotation of the link bracket 36, the pillar guide attachment frame 30 and the head rest S3 move back and forth. Particularly in a case where the rear load is input to the vehicle due to, e.g., vehicle rear collision, the rotary members 20 rotate backward. In this state, the pillar guide attachment frame 30 rotates forward together with the link brackets 36, and accordingly, rotates in the direction of tilting the head rest S3 forward.

As described above, upon vehicle rear collision, the head rest S3 tilts forward in association with back rotation of the rotary members 20. In other words, upon vehicle rear collision, backward rotation of the rotary members 20 from the initial position is accompanied by a change in the degree of forward tilting of the head rest S3. The head rest S3 approaches the occupant's head by forward tilting of the head rest S3 upon vehicle rear collision, and as a result, the burden (impact) on the occupant's neck is reduced.

As described above, the present seat S is a vehicle seat whose state changes when the rear load is input to the vehicle due to vehicle rear collision. Specifically, the changeable state of the present seat S includes the position of the pressure receiving plate 14 in the front-to-back direction and the degree of forward tilting of the head rest S3.

The changed state of the present seat S (the position of the pressure receiving plate 14 and the degree of forward tilting of the head rest S3) described herein is set to such values that the burden on the occupant's neck can be properly reduced. The values of settings on the changed state vary depending on the load on the present seat S from the occupant in association with input of the rear load to the vehicle, specifically the magnitude of the load on the seat back S1 from the occupant's back. Moreover, the magnitude of such a load varies depending on the physique and weight of the occupant seated on the present seat S and other feature values regarding the occupant's body. Note that the "feature values regarding the occupant's body" are values of characteristics of the occupant's body influencing the above-described load, the values being able to be converted into numerals (quantified). These feature values include, such as, the occupant's physique, physical type, weight, skeletal shape, seating height, and shoulder width.

In light of the above-described point, the present seat S is configured such that an arrival position of the pressure receiving plate 14 and the degree of forward tilting of the head rest S3 upon vehicle rear collision are set to proper values according to the feature values regarding the occupant's body. Such a point is a characteristic configuration of an embodiment of the present seat S, and is described below in detail.

Characteristic Configuration of Vehicle Seat of the Present Embodiment

Figure 4:
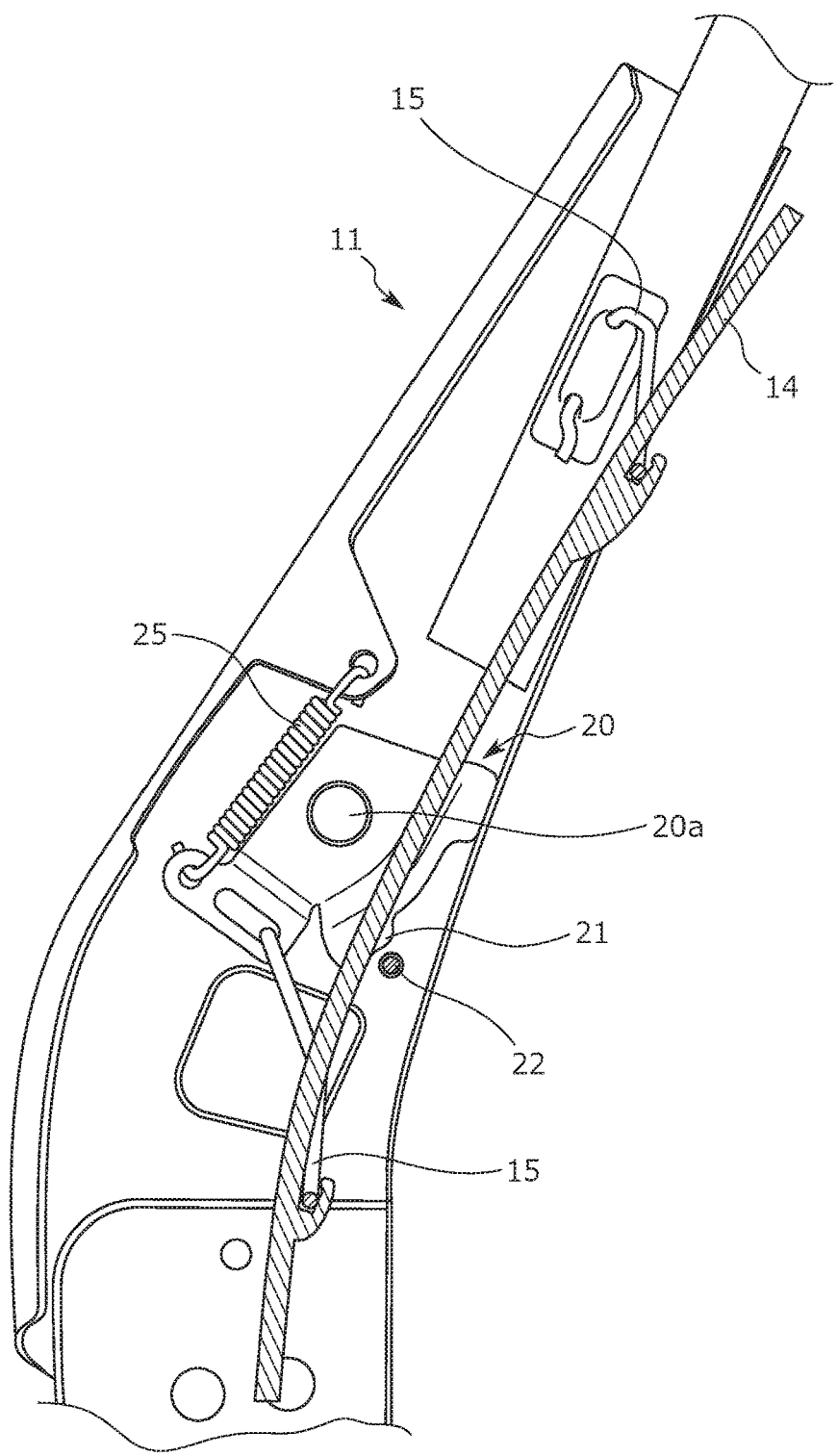
FIG. 4 is a side, schematic view of a seat back frame, according to an embodiment.
Figure 5:
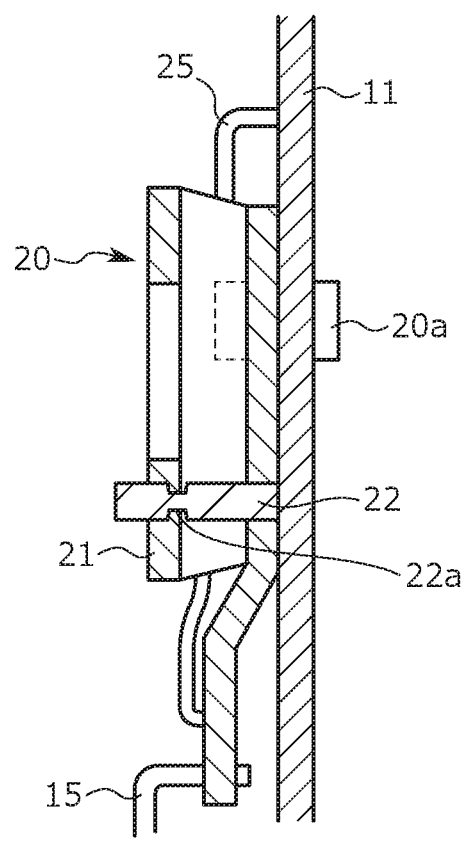
FIG. 5 is a cross-sectional view of a rotary member from a back, according to an embodiment.
Figure 6:
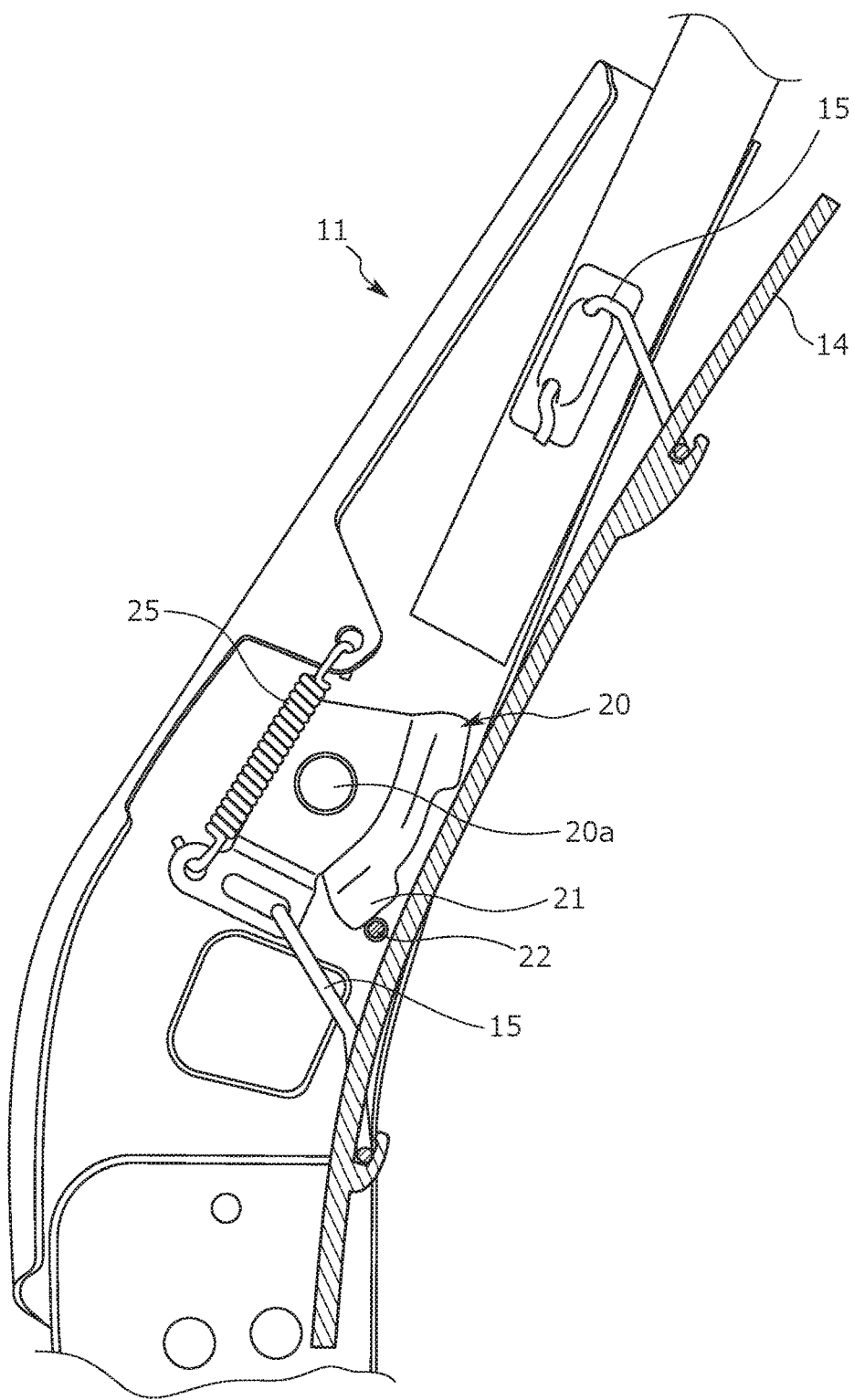
FIG. 6 is a side, schematic view of a state when the rotary member reaches a first position, according to an embodiment.
Figure 7:
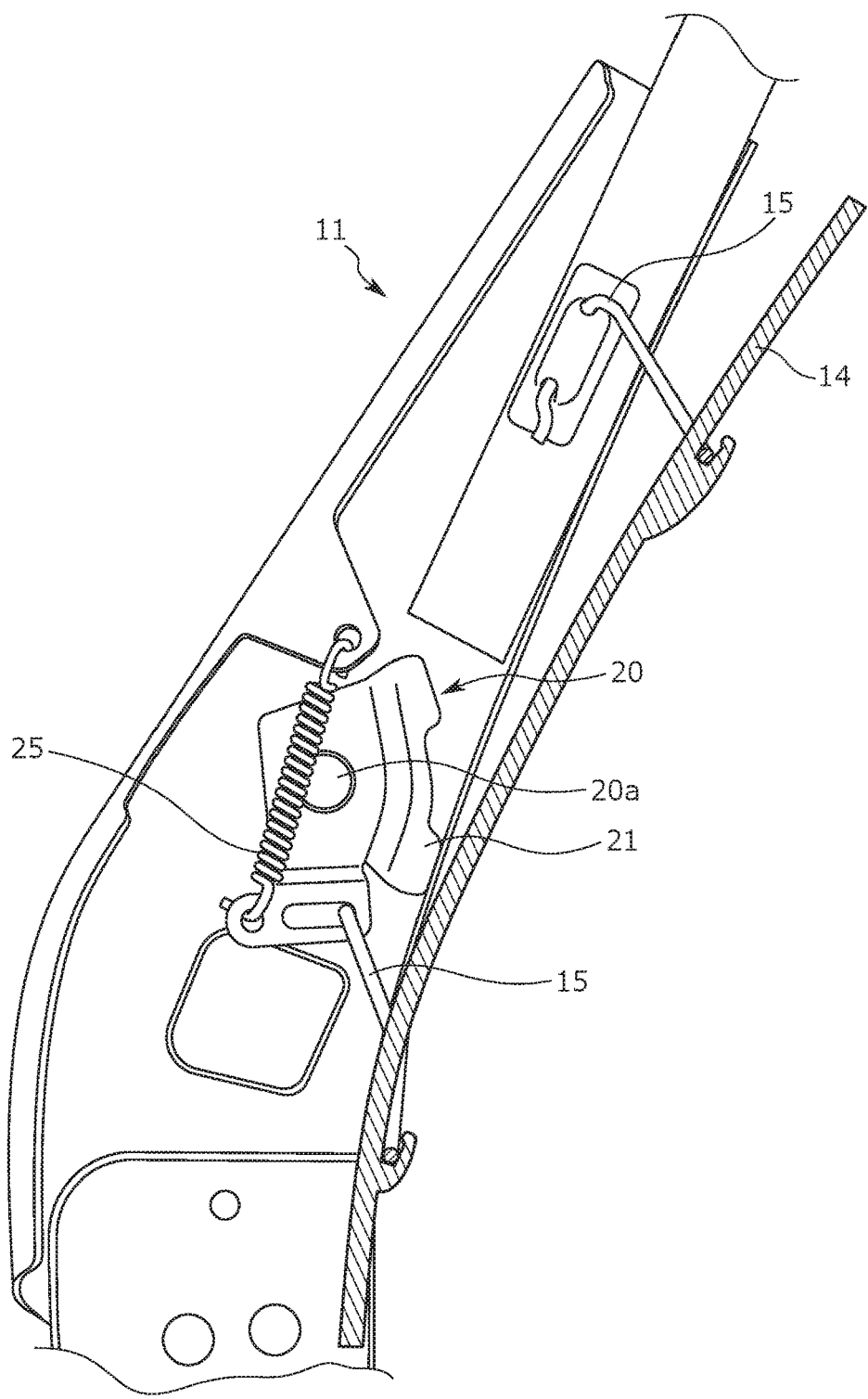
FIG. 7 is a side, schematic view of a state when the rotary member reaches a second position, according to an embodiment.

In the present seat S, the arrival position of the pressure receiving plate 14 and the degree of forward tilting of the head rest S3 upon vehicle rear collision vary, as described above, depending on the feature values (e.g., body shape and weight) on the occupant's body. Specifically, in the present seat S, the amount of rotation of the rotary member 20 upon vehicle rear collision changes according to the occupant's physical type and weight. Such a configuration is described with reference to FIGS. 4 to 9. FIG. 4 is a side, schematic view for describing the rotary member 20 and a peripheral structure thereof, and illustrates a lateral cross-sectional view of the seat back frame. FIG. 5 is a cross-sectional view of the rotary member 20 and the periphery thereof from the back. FIG. 6 is a side, schematic view of a state when the rotary member 20 reaches a later-described first position. FIG. 7 is a side, schematic view of a state when the rotary member 20 reaches a later-described second position.

Figure 8:
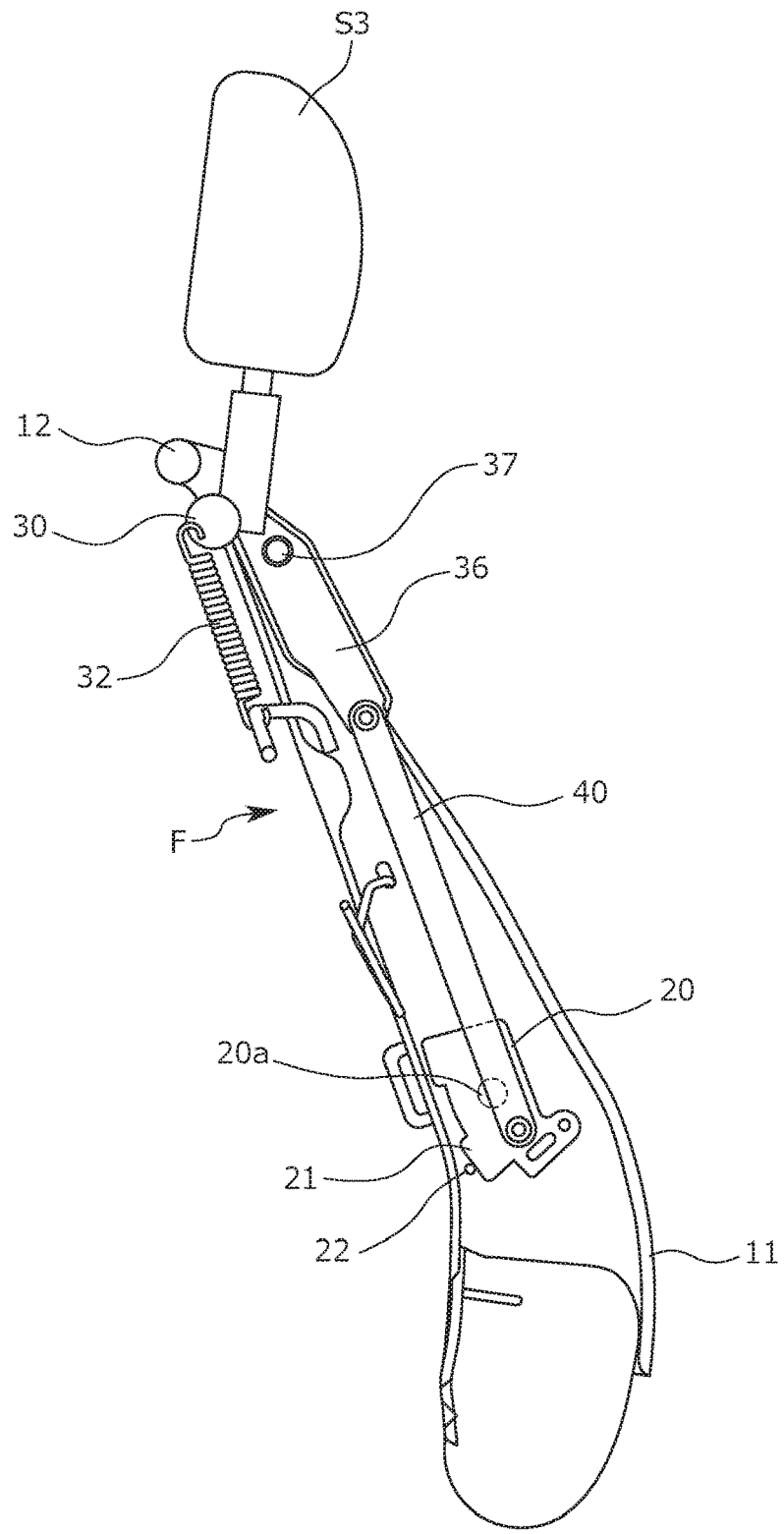
FIG. 8 is a side, schematic view of a state when the head rest reaches a first arrival position, according to an embodiment.
Figure 9:
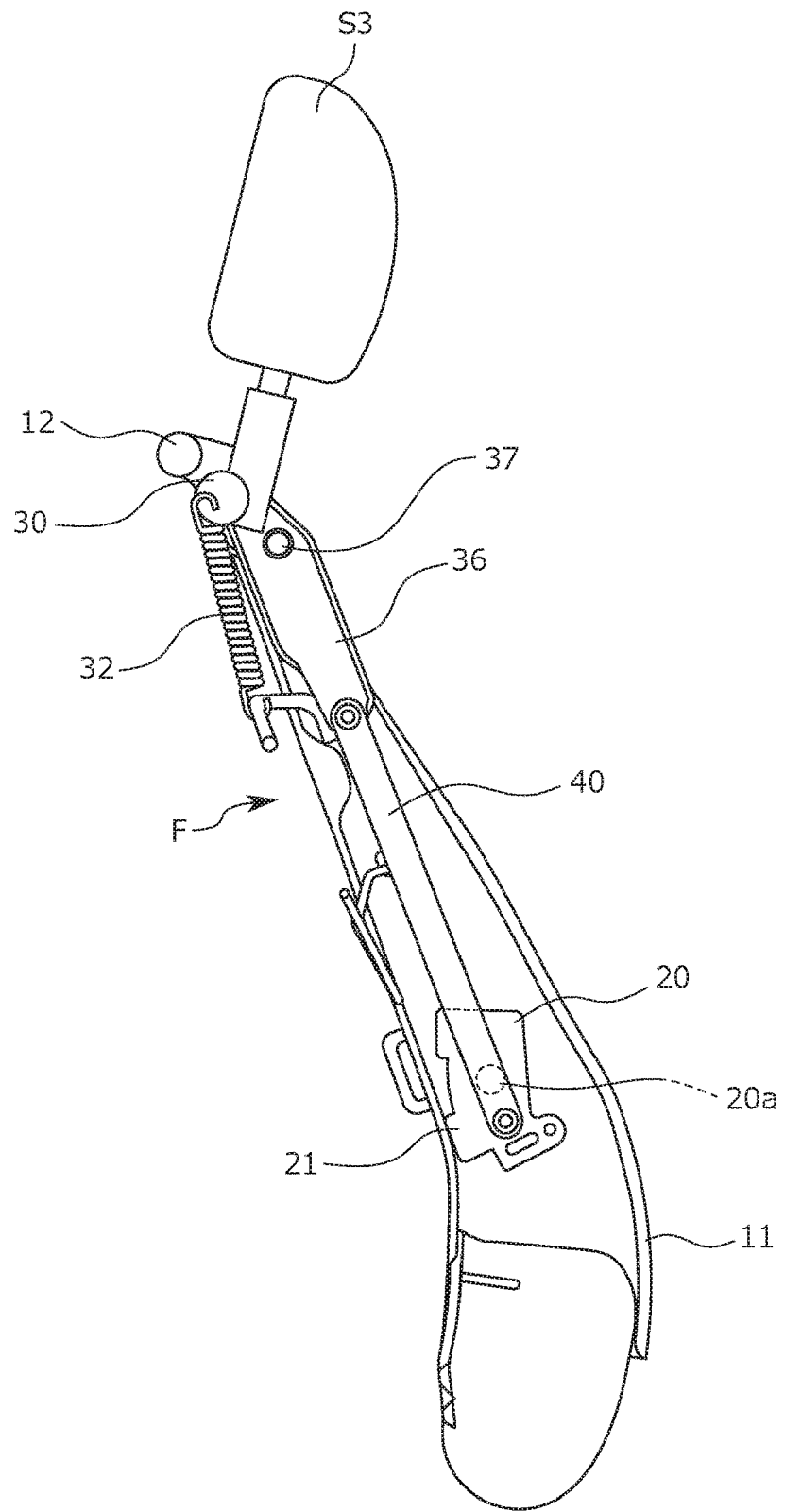
FIG. 9 is a side, schematic view of a state when the head rest reaches a second arrival position, according to an embodiment.

FIG. 8 is a side, schematic view of a state when the head rest S3 reaches a later-described first arrival position. FIG. 9 is a side, schematic view of a state when the head rest S3 reaches a later-described second arrival position. Note that some components (e.g., the torsion spring 25) around the rotary member 20 are not shown in FIGS. 8 and 9 for the sake of clarity.

The rotary member 20 is at the initial position illustrated in FIG. 4 in the normal state, and rotates backward from the initial position upon vehicle rear collision. Then, when the rotary member 20 rotates backward to the predetermined position, a tongue-shaped back end portion 21 as a contact target portion formed at a back end portion of the rotary member 20 comes into contact with a lock pin 22. This lock pin 22 is a movement restriction portion configured to contact the tongue-shaped back end portion 21 to restrict backward rotation of the rotary member 20, and is disposed on a rotation track of the tongue-shaped back end portion 21 upon backward rotation of the rotary member 20. Moreover, the lock pin 22 is a pin having a substantially cylindrical columnar shape, and protrudes inward in the width direction from the inner surface of the side frame 11 as illustrated in FIG. 5.

Further, as illustrated in FIG. 5, a groove-shaped recessed portion 22a is formed at an outer peripheral surface of the lock pin 22. This groove-shaped recessed portion 22a is equivalent to a weak portion of the lock pin 22 with a low (brittle) strength. The groove-shaped recessed portion 22a is formed to extend in a loop along the outer peripheral surface of the lock pin 22. When a pressing force equal to or greater than a threshold acts on the lock pin 22, the lock pin 22 deforms starting from the groove-shaped recessed portion 22a, and more specifically, shears and deforms starting from the groove-shaped recessed portion 22a. The threshold described herein is a value preset as the pressing force upon shear of the lock pin 22, and can be set to any suitable value.

With the above-described lock pin 22, multiple arrival positions when the rotary member 20 rotates backward upon vehicle rear collision are set in the front-to-back direction. More specifically, upon vehicle rear collision, the pressure receiving plate 14 is pushed backward by the occupant's back, and accordingly, the rotary member 20 moves backward from the initial position. Eventually, the rotary member 20 reaches the first position illustrated in FIG. 6. In this state, when the load on the pressure receiving plate 14 from the occupant's back is less than a predetermined value, the rotary member 20 is held in a state in which the rotary member 20 is locked by the lock pin 22, i.e., a state in which the tongue-shaped back end portion 21 contacts the lock pin 22. That is, when the load on the pressure receiving plate 14 from the occupant's back is less than the predetermined value, the rotary member 20 is held at the first position under movement restriction by the lock pin 22.

On the other hand, when the load on the pressure receiving plate 14 from the occupant's back is equal to or greater than the predetermined value, the rotary member 20 reaches the first position to contact the lock pin 22, and therefore, presses the lock pin 22 with the pressing force equal to or greater than the threshold. Thus, the lock pin 22 shears and deforms starting from the groove-shaped recessed portion 22a. Then, by shear and deformation of the lock pin 22, the rotary member 20 further rotates backward beyond a contact state (in other words, rotation restriction by the lock pin 22)

between the tongue-shaped back end portion 21 and the lock pin 22. Eventually, the rotary member 20 reaches a position at which the tongue-shaped back end portion 21 contacts a back wall of the side frame 11, i.e., the second position, as illustrated in FIG. 7. Note that the second position is a terminal end position upon backward rotation of the rotary member 20, and is apart further from the initial position than the first position.

As described above, in the present seat S, when the load on the pressure receiving plate 14 from the occupant's back is less than the predetermined value, the rotary member 20 moves from the initial position to reach the first position, and then, the lock pin 22 holds the rotary member 20 at the first position. On the other hand, when the above-described load is equal to or greater than the predetermined value, the rotary member 20 presses, after having reached the first position, the lock pin 22 to shear and deform the lock pin 22. In this manner, the rotary member 20 further rotates backward toward the second position beyond rotation restriction by the lock pin 22.

As seen from comparison between FIGS. 6 and 7, when the rotary member 20 is at the second position, the position of the pressure receiving plate 14 is closer to the back than that when the rotary member 20 is at the first position. That is, when the rotary member 20 is at the second position, the occupant's back sinks deeper in the seat back S1.

Moreover, when the rotary member 20 is at the first position, the head rest S3 is at a position (hereinafter referred to as the "first arrival position") illustrated in FIG. 8. The first arrival position is a position slightly tilting forward than the position of the head rest S3 in the normal state. On the other hand, when the rotary member 20 is at the second position, the head rest S3 is at a position (hereinafter referred to as the "second arrival position") illustrated in FIG. 9. The second arrival position is a position further tilting forward as compared to the first arrival position. That is, when the rotary member 20 is at the second position, the degree of forward tilting of the head rest S3 is greater than that when the rotary member 20 is at the first position.

As a result of above, in a case where the occupant is, e.g., a female or a physically-small male, the load on the pressure receiving plate 14 upon vehicle rear collision is less than the predetermined value, and therefore, the rotary member 20 is held at the first position by the lock pin 22 after having reached the first position. As a result, a sinking amount when the occupant sinks in the seat back S1 becomes smaller, and a clearance between the occupant's head and the head rest S3 right after vehicle rear collision becomes greater.

On the other hand, in a case where the occupant is, e.g., a physically-large male, the load on the pressure receiving plate 14 upon vehicle rear collision is equal to or greater than the predetermined value. After having reached the first position, the rotary member 20 shears and deforms the lock pin 22, thereby further rotating from the first position toward the second position. As a result, the sinking amount when the occupant sinks in the seat back S1 becomes greater, and the clearance between the occupant's head and the head rest S3 right after vehicle rear collision becomes smaller.

With the above-described characteristic configuration, the arrival position of the pressure receiving plate 14 and the degree of forward tilting of the head rest S3 upon vehicle rear collision are, in the present seat S, switchable according to the occupant's physical type, weight, etc. That is, the arrival position of the pressure receiving plate 14 and the degree of forward tilting of the head rest S3 change to the values suitable for the occupant's physical type, weight, etc. upon vehicle rear collision. As a result, when the arrival position of the pressure receiving plate 14 and the degree of forward tilting of the head rest S3 are changed for the purpose of reducing the burden on the occupant's neck upon vehicle rear collision, the changed state can be properly set considering the occupant's physical type, weight, etc.

Variations of Characteristic Configuration

Next, variations (specifically, a first variation, a second variation, and a third variation) on the characteristic configuration of the present seat S is described. Note that in the description below, descriptions of values overlapping with those of the above-described configuration example will not be repeated. Moreover, in views (specifically, FIGS. 10A to 12) for describing the variations, the same reference numerals as those used in the above-described configuration example are used to represent units/components overlapping with those of the above-described configuration example.

First Variation

Figure 10A:
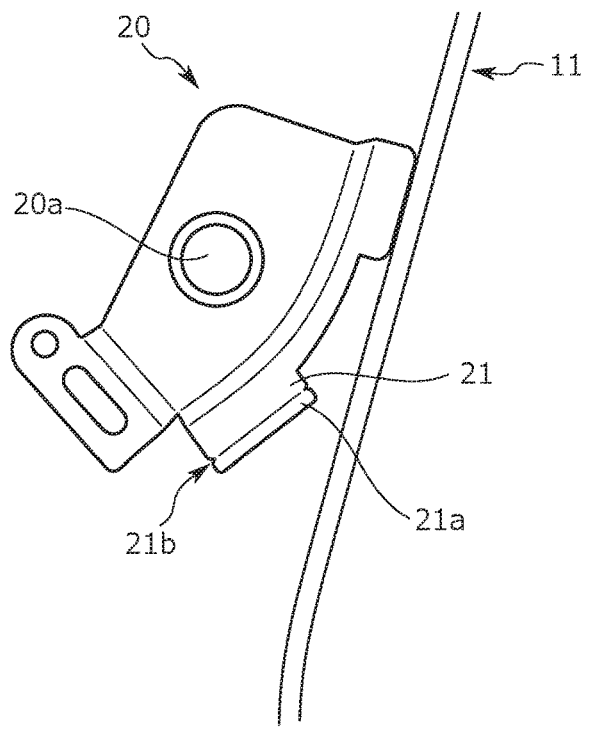
FIG. 10A is a side view of a rotary member of a first variation (No. 1)
Figure 10B:
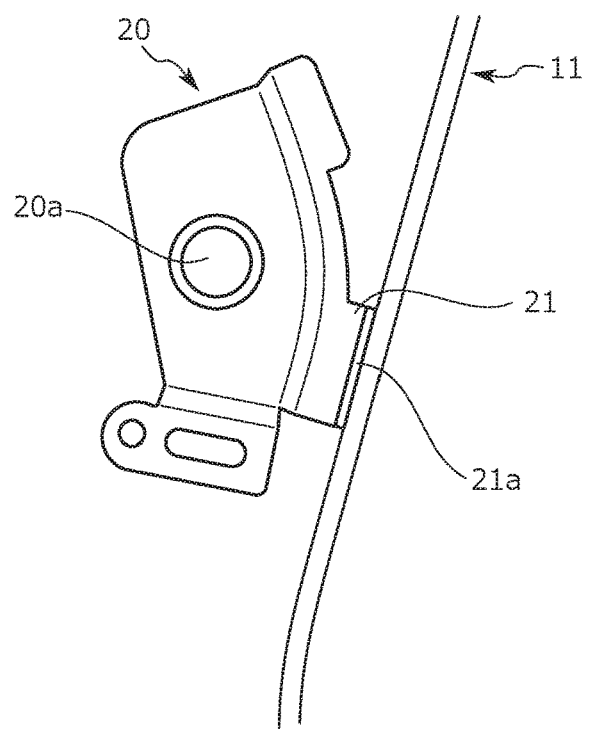
FIG. 10B is a side view of the rotary member of the first variation (No. 2)

The first variation is described below with reference to FIGS. 10A and 10B. FIGS. 10A and 10B are side views of the rotary member 20 of the first variation.

In the above-described configuration example, when the rotary member 20 reaches the first position upon vehicle rear collision, the rotary member 20 comes into contact with the lock pin 22 at the first position. In this state, when the load on the pressure receiving plate 14 is equal to or greater than the predetermined value, the rotary member 20 presses the lock pin 22 with the pressing force equal to or greater than the threshold, and as a result, the lock pin 22 shears and deforms. Accordingly, the rotary member 20 further rotates backward from the first position toward the second position.

On the other hand, in the first variation, when the load on the pressure receiving plate 14 is equal to or greater than the predetermined value, the rotary member 20 deforms. More specifically, in the first variation, a cut 21b is formed at the tongue-shaped back end portion 21 as the contact target portion formed at the back end portion of the rotary member 20, as illustrated in FIG. 10A. This cut 21b functions as a deformation start point of the tongue-shaped back end portion 21 when the pressing force equal to or greater than the threshold acts on the tongue-shaped back end portion 21. Specifically, when the pressing force equal to or greater than the threshold acts on the tongue-shaped back end portion 21, the tongue-shaped back end portion 21 bends starting from the cut 21b. As a result, a portion (hereinafter referred to as a "backmost end portion 21a") of the tongue-shaped back end portion 21 positioned at the back with respect to the cut 21b bends to tilt inward in the width direction, and becomes shorter as illustrated in FIG. 10B.

In the first variation where the rotary member 20 configured as described above is provided, when the rotary member 20 rotates backward upon vehicle rear collision, the tongue-shaped back end portion 21 before bending comes into contact with the back wall of the side frame 11 at the backmost end portion 21a. In the first variation, the position of the rotary member 20 in this state is equivalent to the first position, and the back wall of the side frame 11 is equivalent to the movement restriction portion.

When the load on the pressure receiving plate 14 upon vehicle rear collision is less than the predetermined value, the rotary member 20 of the first variation comes into contact with the side frame 11 at the backmost end portion 21a, and then, is held at the position upon such contact, i.e., the first position.

On the other hand, when the above-described load is equal to or greater than the predetermined value and the rotary member 20 of the first variation reaches the first position, the rotary member 20 receives, from the back wall of the side frame 11, reactive force (in other words, the pressing force) equal to or greater than the threshold. The tongue-shaped back end portion 21 is pressed by such pressing force, and as a result, deforms to bend starting from the cut 21b. By such deformation of the tongue-shaped back end portion 21, the rotary member 20 of the first variation further rotates backward from the first position, and eventually, rotates to such a position that the rotary member 20 contacts the back wall of the side frame 11 at the backmost end portion 21a tilting inward in the width direction as illustrated in FIG. 10B. Such a position is equivalent to the second position in the first variation.

As described above, in the first variation, when the load on the pressure receiving plate 14 upon vehicle rear collision is equal to or greater than the predetermined value and the rotary member 20 is at the first position, the tongue-shaped back end portion 21 deforms by pressing from the back wall of the side frame 11 with the pressing force equal to or greater than the threshold. Thereafter, by deformation of the tongue-shaped back end portion 21, the rotary member 20 further rotates from the first position toward the second position beyond rotation restriction by the side frame 11.

In the first variation configured as described above, when the strength of the tongue-shaped back end portion 21 can be set to a proper value, a seat state (specifically, the position of the pressure receiving plate 14 and the degree of forward tilting of the head rest S3) changeable upon vehicle rear collision can be properly changed according to the occupant's physique, weight, etc. As a result, the effect of reducing the burden on the occupant's neck by the change in the seat state upon vehicle rear collision is properly exerted reflecting the occupant's physical type, weight, etc.

Second Variation

Figure 11:
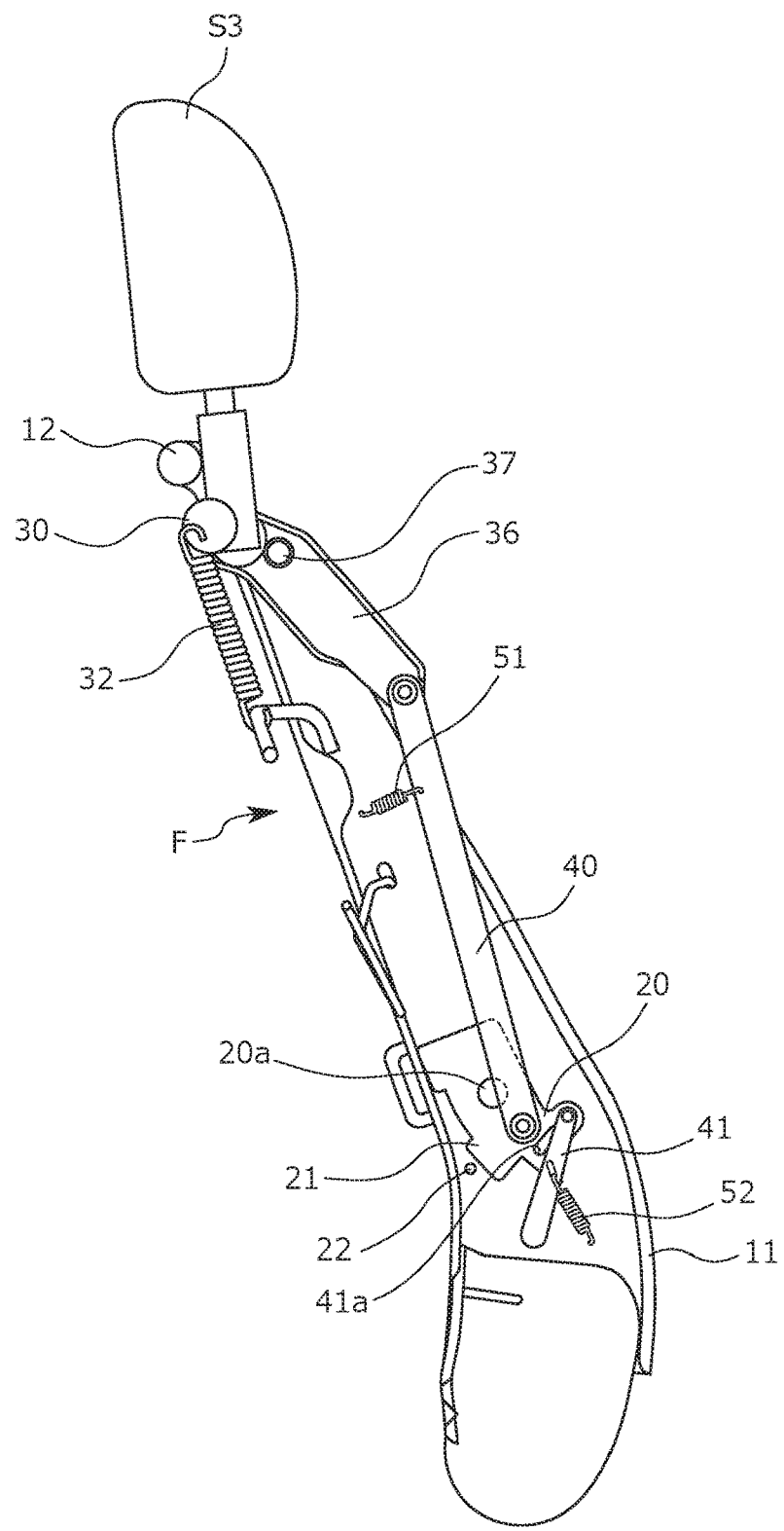
FIG. 11 is a side, schematic view for describing a movement restriction portion of a second variation, according to an embodiment.

The second variation is described below with reference to FIG. 11. FIG. 11 is a side, schematic view for describing the movement restriction portion of the second variation, FIG. 11 corresponding to FIG. 3. Note that for the sake of clarity, some components (e.g., the torsion spring 25) around the rotary member 20 are not shown in FIG. 11.

In the above-described configuration example, when the rotary member 20 rotates backward to reach the first position, the movement restriction portion (specifically, the lock pin 22) comes into contact with a portion of the rotary member 20, and therefore, rotation of the rotary member 20 is restricted.

On the other hand, in the second variation, biasing force for blocking rotation (movement) is applied to the rotary member 20, and therefore, rotation of the rotary member 20 is restricted. More specifically, in the second variation, two biasing springs are utilized as the movement restriction portion. One biasing spring (hereinafter referred to as a "first biasing spring 51") is bridged between the side frame 11 and the coupling link 40 as illustrated in FIG. 11.

When the load acts on the pressure receiving plate 14 upon vehicle rear collision (in other words, when the rotary member 20 rotates backward), the first biasing spring 51 constantly generates the biasing force. This biasing force is transmitted to the rotary member 20 through the coupling link 40, and acts in the direction of blocking backward rotation of the rotary member 20. Note that the biasing force of the first biasing spring 51 is relatively small. Thus, the rotary member 20 of the second variation can easily rotate backward against the biasing force of the first biasing spring 51 upon vehicle rear collision.

The other biasing spring (hereinafter referred to as a "second biasing spring 52") is bridged between the side frame 11 and a second coupling link 41 as illustrated in FIG. 11. In this variation, the second coupling link 41 is a link member interposed between the rotary member 20 and the side frame 11, and swings in association with rotation operation of the rotary member 20.

Moreover, the second coupling link 41 has a long hole 41a engaging with one end portion of the second biasing spring 52. When one end portion of the second biasing spring 52 is hooked on a lower end of an inner edge surface of this long hole 41a, the second biasing spring 52 generates the biasing force. This biasing force is transmitted to the rotary member 20, and acts in the direction of blocking backward rotation of the rotary member 20. Note that the biasing force of the second biasing spring 52 is relatively great. Thus, for rotating the rotary member 20 backward against the biasing force of the second biasing spring 52 in the second variation, the load acting on the pressure receiving plate 14 needs to be equal to or greater than the predetermined value.

As described above, in the second variation, the two biasing springs function as a biasing portion, and upon vehicle rear collision, provide the rotary member 20 with the biasing force in the direction of blocking backward rotation of the rotary member 20. The biasing force of each biasing spring is described herein. The first biasing spring 51 generates the biasing force in a case where the rotary member 20 rotates backward with respect to the initial position (more specifically, a case where the coupling link 40 is displaced in association with backward rotation of the rotary member 20). On the other hand, the second biasing spring 52 generates the biasing force at the point of arrival of the rotary member 20 at the first position.

More specifically, at a stage prior to arrival of the rotary member 20 at the first position, one end portion of the second biasing spring 52 is inserted into the long hole 41a formed at the second coupling link 41, but does not engage with the inner edge surface of the long hole 41a. Thereafter, when the rotary member 20 reaches the first position, one end portion of the second biasing spring 52 comes into engagement with the lower end portion of the inner edge surface of the long hole 41a. Thus, in addition to the biasing force of the first biasing spring 51, the biasing force of the second biasing spring 52 is further applied to the rotary member 20.

As described above, in the second variation, the magnitude of biasing force for blocking backward rotation of the rotary member 20 is different between before and after arrival of the rotary member 20 at the first position. In the second variation, the magnitude of biasing force is different between before and after arrival of the rotary member 20 at the first position, and therefore, the arrival position of the rotary member 20 upon vehicle rear collision is switched.

Specifically, when the load acts on the pressure receiving plate 14 upon vehicle rear collision, the rotary member 20 of the second variation moves backward from the initial position toward the first position. Only the biasing force of the first biasing spring 51 acts on the rotary member 20, and therefore, the rotary member 20 easily reaches the first position. Thereafter, when the rotary member 20 reaches the first position, the biasing force of both of the first biasing spring 51 and the second biasing spring 52 acts on the rotary member 20. At this point, when the above-described load is less than the predetermined value, the rotary member 20 is held at the first position by the biasing force (i.e., the magnitude of biasing force after the rotary member 20 has reaches the first position) of both biasing springs. On the other hand, when the above-described load is equal to or greater than the predetermined value, the rotary member 20 further rotates backward toward the second position against the biasing force of both biasing springs.

As described above, in the second variation, when the load on the pressure receiving plate 14 upon vehicle rear collision is equal to or greater than the predetermined value, the rotary member 20 further rotates, after having reached the first position, backward toward the second position against the biasing force of both of the first biasing spring 51 and the second biasing spring 52. Conversely, when the above-described load is less than the predetermined value, the rotary member 20 is held at the first position because the rotary member 20 cannot move against the biasing force of the two biasing springs described above.

In the second variation configured as described above, when the biasing force of each biasing spring, particularly the biasing force provided by the second biasing spring 52, can be set to a proper value, the seat state (specifically, the position of the pressure receiving plate 14 and the degree of forward tilting of the head rest S3) changeable upon vehicle rear collision can be properly changed according to the occupant's physique, weight, etc. As a result, the effect of reducing the burden on the occupant's neck by the change in the seat state upon vehicle rear collision is properly exerted reflecting the occupant's physical type, weight, etc.

Note that in the above-described case, the plurality of biasing springs (specifically, the first biasing spring 51 and the second biasing spring 52) different from each other in the timing of generating the biasing force are used for differentiating the magnitude of biasing force between before and after arrival of the rotary member 20 at the first position. Note that the present disclosure is not limited to such a case. The biasing portion may include a single member, and such a member may provide different magnitudes of biasing force between before and after arrival of the rotary member 20 at the first position.

Third Variation

Figure 12:
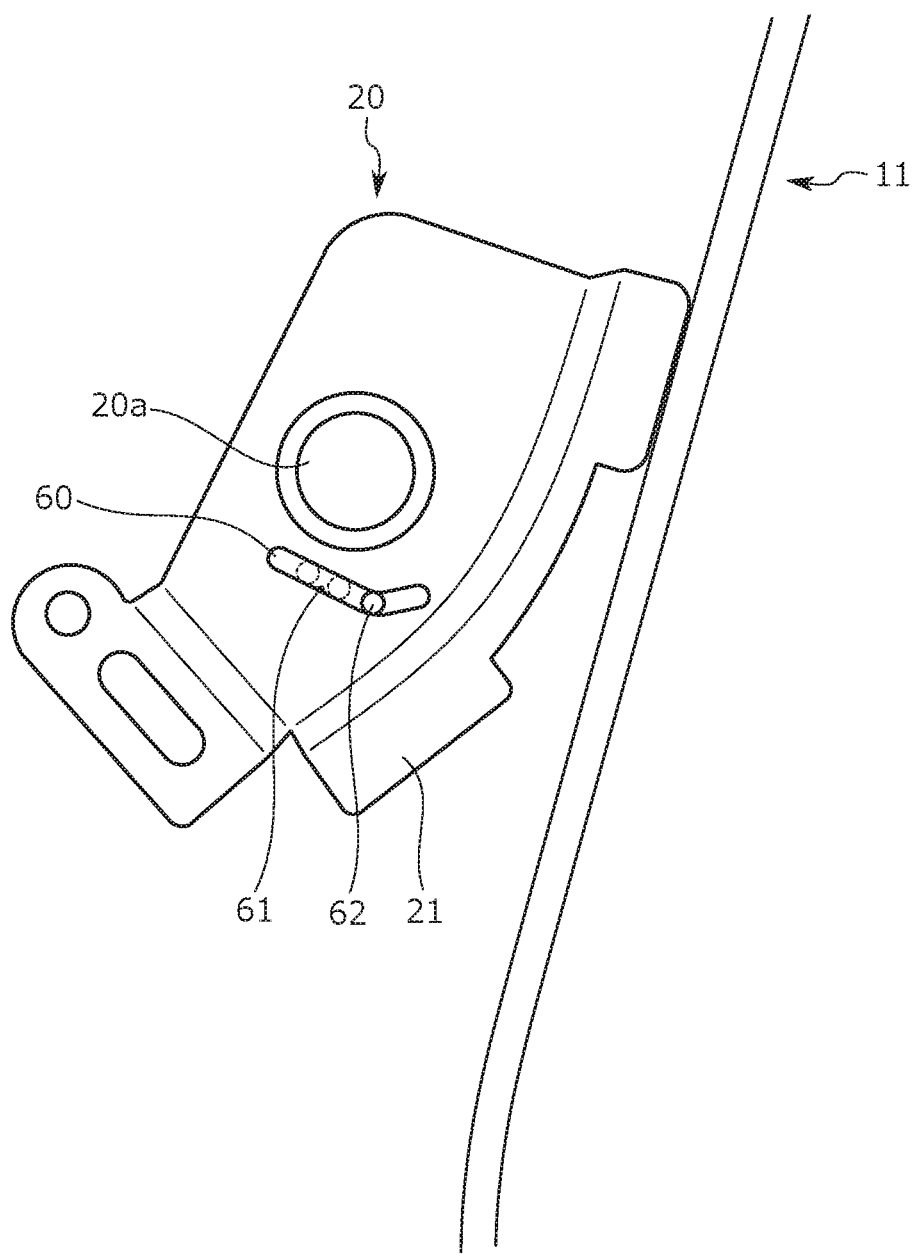
FIG. 12 is a side view of a rotary member of a third variation and a peripheral structure thereof, according to an embodiment.

The third variation is described below with reference to FIG. 12. FIG. 12 is a side view of the rotary member 20 of the third variation and a peripheral structure thereof.

As illustrated in FIG. 12, the rotary member 20 of the third variation has a through-hole 60 extending in the front-to-back direction. As illustrated in this figure, the through-hole 60 bends in a substantially V-like shape. The through-hole 60 has a front portion inclined to extend upward toward the front, and a back portion inclined to extend upward toward the back. Further, at a middle position of the back portion, a lock portion 62 is formed in such a manner that an inner edge surface of the through-hole 60 is raised in a hill shape.

Moreover, in the third variation, a substantially circular columnar raised portion 61 is formed at a predetermined portion, more specifically the side frame 11 of the seat back frame F. This raised portion 61 is equivalent to the movement restriction portion of the third variation. The raised portion 61 protrudes inward in the width direction from the inner surface of the side frame 11, and more specifically, protrudes toward the through-hole 60 of the rotary member 20. Moreover, the raised portion 61 is inserted into the through-hole 60 as illustrated in FIG. 12.

Upon rotation of the rotary member 20, the raised portion 61 accordingly moves relative to the rotary member 20 in the front-to-back direction in the through-hole 60. More specifically, when the rotary member 20 is at the initial position, the raised portion 61 is positioned at a bent portion in the through-hole 60 as illustrated in FIG. 12. When the rotary member 20 rotates backward from such a state, the raised portion 61 moves relative to the rotary member 20, and then, moves up along an inclined portion (the front portion) of the through-hole 60.

Then, when the raised portion 61 moves forward in the through-hole 60 in association with backward rotation of the rotary member 20, the raised portion 61 eventually contacts the above-described lock portion 62 in the through-hole 60. Since the raised portion 61 and the lock portion 62 contact each other as described above, relative movement of the raised portion 61, i.e., backward rotation of the rotary member 20, is restricted. Note that in the third variation, the position of the rotary member 20 in this state is equivalent to the first position.

When the load on the pressure receiving plate 14 is less than the predetermined value at the point of arrival of the rotary member 20 at the first position, the raised portion 61 is continuously locked at the lock portion 62, and the rotary member 20 is held at the position at that point, i.e., the first position. On the other hand, when the above-described load is equal to or greater than the predetermined value, the raised portion 61 moves over the lock portion 62 in the through-hole 60. That is, when the above-described load is equal to or greater than the predetermined value, the rotary member 20 of the third variation further moves backward from the first position. Eventually, the rotary member 20 rotates to such a position that the tongue-shaped back end portion 21 contacts the back wall of the side frame 11. Such a position is equivalent to the second position in the third variation.

As described above, in the third variation, when the load on the pressure receiving plate 14 upon vehicle rear collision is equal to or greater than the predetermined value, the rotary member 20 rotates backward such that the raised portion 61 contacting the lock portion 62 moves over the lock portion 62. That is, the rotary member 20 of the third variation further rotates from the first position toward the second position beyond a contact state between the raised portion 61 and the lock portion 62.

In the third variation configured as described above, when the shapes, etc. of the raised portion 61 and the lock portion 62 are set to suitable values, the seat state (specifically, the position of the pressure receiving plate 14 and the degree of forward tilting of the head rest S3) changeable upon vehicle rear collision can be suitably changed according to the occupant's physique, weight, etc. As a result, the effect of reducing the burden on the occupant's neck by the change in the seat state upon vehicle rear collision is properly exerted reflecting the occupant's physical type, weight, etc.

Note that in the above-described case, when the load on the pressure receiving plate 14 upon vehicle rear collision is equal to or greater than the predetermined value, the raised portion 61 contacting the lock portion 62 moves over the lock portion 62, and therefore, the rotary member 20 moves toward the second position. Note that the present disclosure is not limited to such a case. When the above-described load is equal to or greater than the predetermined value, the raised portion 61 may shear and deform (i.e., break) the lock portion 62 such that the rotary member 20 moves toward the second position.

TABLE OF REFERENCE NUMERALS

11: side frame
   11a: through-hole

12: upper frame
13: lower member frame
14: pressure receiving plate (pressure receiving member)
15: wire
20: rotary member
 20a: rotary shaft
21: tongue-shaped back end portion (contact target portion)
 21a: backmost end portion (contact target portion)
 21b: cut
22: lock pin (pin)
 22a: groove-shaped recess (weak portion)
25: torsion spring
30: pillar guide attachment frame
31: pillar guide
32: coil spring
36: link bracket
37: shaft
38: rotation support member
39: shaft
40: coupling link
41: second coupling link
 41a: long hole
51: first biasing spring (biasing portion)
52: second biasing spring (biasing portion)
60: through-hole
61: raised portion
62: lock portion
F: seat back frame
HP: head rest pillar
S: present seat (vehicle seat)
S1: seat back
S2: seat cushion
S3: head rest
Sf: seat frame

The invention claimed is:

1. A conveyance seat whose state is changeable when a rear load is input to a conveyance, comprising:
 a movable portion configured to move from an initial position in association with the state change;
 a movement restriction portion configured to restrict movement of the movable portion; and
 a pressure receiving member provided in a seat back and pushed by a back of the occupant;
 wherein in a case where an occupant load on the conveyance seat from an occupant of the conveyance in association with input of the rear load changes according to a feature value regarding a body of the occupant,
  when the occupant load is less than a predetermined value and the movable portion moves from the initial position to reach a first position, the movement restriction portion holds the movable portion at the first position, and
  when the occupant load is equal to or greater than the predetermined value, the movable portion further moves, after having reached the first position, toward a second position beyond movement restriction by the movement restriction portion, the second position being apart further from the initial position than the first position;
 wherein when the rear load is input to the conveyance, the pressure receiving member is pushed by the back of the occupant to move backward together with the back of the occupant,
  the state is a position of the pressure receiving member in a front-to-back direction,
  the movable portion moves in association with a change in the position of the pressure receiving member, and
  the position of the pressure receiving member when the movable portion is at the second position is on a back side with respect to that when the movable portion is at the first position.

2. The conveyance seat of claim 1, wherein
 the movement restriction portion is a contact portion configured to contact the movable portion when the movable portion reaches the first position, thereby restricting the movement of the movable portion,
 the contact portion deforms when pressed with a pressing force equal to or greater than a threshold, and
 when the occupant load is equal to or greater than the predetermined value, the movable portion deforms, in contact with the contact portion at the first position, the contact portion by pressing the contact portion with the pressing force equal to or greater than the threshold, and deformation of the contact portion allows the movable portion to move toward the second position beyond a contact state with the contact portion.

3. The conveyance seat of claim 2, wherein
 the contact portion is a pin provided with a weak portion, and
 the pin deforms starting from the weak portion when pressed with the pressing force equal to or greater than the threshold.

4. The conveyance seat of claim 1, wherein
 the movable portion has a contact target portion contacting the movement restriction portion when the movable portion reaches the first position,
 the contact target portion deforms when pressed with a pressing force equal to or greater than a threshold, and
 when the occupant load is equal to or greater than the predetermined value and the movable portion is at the first position, the contact target portion is deformed by pressed from the movement restriction portion with the pressing force equal to or greater than the threshold, and deformation of the contact target portion allows the movable portion to move toward the second position beyond the movement restriction by the movement restriction portion.

5. The conveyance seat of claim 1, wherein
 the movement restriction portion is a biasing portion configured to provide the movable portion with biasing force in a direction that blocks the movement of the movable portion,
 the biasing portion provides different magnitudes of the biasing force between i) before arrival of the movable portion at the first position, and ii) after arrival of the movable portion at the first position, and
 when the occupant load is less than the predetermined value, the movable portion having reached the first position is held at the first position by the magnitude of the biasing force after the arrival of the movable portion at the first position, and when the load is equal to or greater than the predetermined value, the movable portion moves toward the second position against the magnitude of the biasing force after the arrival of the movable portion at the first position.

6. The conveyance seat of claim 1, wherein
 the movement restriction portion is a raised portion of the seat back protruding toward the movement portion,
 the raised portion
  is inserted into a through-hole formed at the movable portion, and moves back and forth in the through-hole in association with the movement of the movable portion and contacts a lock portion provided in the through-hole when the movable portion reaches the first position, and when the occupant load is equal to or greater than the predetermined value, the raised portion moves over the lock portion in the through-hole, and the movable portion moves toward the second position beyond a contact state between the raised portion and the lock portion.

7. A conveyance seat whose state is changeable when a rear load is input to a conveyance, comprising:
a movable portion configured to move from an initial position in association with the state change; and
a movement restriction portion configured to restrict movement of the movable portion;
wherein in a case where an occupant load on the conveyance seat from an occupant of the conveyance in association with input of the rear load changes according to a feature value regarding a body of the occupant,
when the occupant load is less than a predetermined value and the movable portion moves from the initial position to reach a first position, the movement restriction portion holds the movable portion at the first position, and
when the occupant load is equal to or greater than the predetermined value, the movable portion further moves, after having reached the first position, toward a second position beyond movement restriction by the movement restriction portion, the second position being apart further from the initial position than the first position;
wherein the movement restriction portion is a contact portion configured to contact the movable portion when the movable portion reaches the first position, thereby restricting the movement of the movable portion,
the contact portion deforms when pressed with a pressing force equal to or greater than a threshold, and
when the occupant load is equal to or greater than the predetermined value, the movable portion deforms, in contact with the contact portion at the first position, the contact portion by pressing the contact portion with the pressing force equal to or greater than the threshold, and deformation of the contact portion allows the movable portion to move toward the second position beyond a contact state with the contact portion.

8. The conveyance seat of claim 7, further comprising:
a head rest configured to support the head of the occupant,
wherein the head rest tilts forward when the rear load is input to the conveyance,
the state is a degree of forward tilting of the head rest,
the movable portion moves in association with a change in the degree of forward tilting, and
the degree of forward tilting when the movable portion is at the second position is greater than that when the movable portion is at the first position.

9. The conveyance seat of claim 7, further comprising:
a pressure receiving member provided in a seat back and pushed by a back of the occupant,
wherein when the rear load is input to the conveyance, the pressure receiving member is pushed by the back of the occupant to move backward together with the back of the occupant,
the state is a position of the pressure receiving member in a front-to-back direction, the movable portion moves in association with a change in the position of the pressure receiving member, and
the position of the pressure receiving member when the movable portion is at the second position is on a back side with respect to that when the movable portion is at the first position.

10. The conveyance seat of claim 7, wherein
the contact portion is a pin provided with a weak portion, and
the pin deforms starting from the weak portion when pressed with the pressing force equal to or greater than the threshold.

11. A conveyance seat whose state is changeable when a rear load is input to a conveyance, comprising:
a movable portion configured to move from an initial position in association with the state change; and
a movement restriction portion configured to restrict movement of the movable portion;
wherein in a case where an occupant load on the conveyance seat from an occupant of the conveyance in association with input of the rear load changes according to a feature value regarding a body of the occupant,
when the occupant load is less than a predetermined value and the movable portion moves from the initial position to reach a first position, the movement restriction portion holds the movable portion at the first position, and
when the occupant load is equal to or greater than the predetermined value, the movable portion further moves, after having reached the first position, toward a second position beyond movement restriction by the movement restriction portion, the second position being apart further from the initial position than the first position;
wherein the movable portion has a contact target portion contacting the movement restriction portion when the movable portion reaches the first position,
the contact target portion deforms when pressed with a pressing force equal to or greater than a threshold, and
when the occupant load is equal to or greater than the predetermined value and the movable portion is at the first position, the contact target portion is deformed by pressed from the movement restriction portion with the pressing force equal to or greater than the threshold, and deformation of the contact target portion allows the movable portion to move toward the second position beyond the movement restriction by the movement restriction portion.

12. The conveyance seat of claim 11, further comprising:
a head rest configured to support the head of the occupant,
wherein the head rest tilts forward when the rear load is input to the conveyance,
the state is a degree of forward tilting of the head rest,
the movable portion moves in association with a change in the degree of forward tilting, and
the degree of forward tilting when the movable portion is at the second position is greater than that when the movable portion is at the first position.

13. The conveyance seat of claim 11, further comprising:
a pressure receiving member provided in a seat back and pushed by a back of the occupant,
wherein when the rear load is input to the conveyance, the pressure receiving member is pushed by the back of the occupant to move backward together with the back of the occupant,
the state is a position of the pressure receiving member in a front-to-back direction, the movable portion moves in association with a change in the position of the pressure receiving member, and
the position of the pressure receiving member when the movable portion is at the second position is on a back side with respect to that when the movable portion is at the first position.

* * * * *